C. C. ROTH.
COMPOUND VALVE AND STARTER.
APPLICATION FILED MAY 22, 1911.

1,040,766.

Patented Oct. 8, 1912.

Witnesses:
L. B. Woerner.
W<sup>m</sup> L. Bushong.

Inventor,
Charles C. Roth,
By
Minturn & Woerner,
Attorneys.

UNITED STATES PATENT OFFICE.

CHARLES C. ROTH, OF INDIANAPOLIS, INDIANA.

COMPOUND VALVE AND STARTER.

1,040,766.  Specification of Letters Patent.  Patented Oct. 8, 1912.

Application filed May 22, 1911. Serial No. 628,839.

*To all whom it may concern:*

Be it known that I, CHARLES C. ROTH, a citizen of the United States, residing at Indianapolis, in the county of Marion and State of Indiana, have invented certain new and useful Improvements in Compound Valves and Starters, of which the following is a specification.

The object of this invention is to supply compressed air to the cylinders of an explosive engine, at rest, to start the engine by the expansive force of said air.

The object, further, is to provide compound air valves between the compressed air tank and the engine cylinders to resist the back pressure through the air pipes caused by the explosion of hydrocarbon in the cylinders, and to provide a plurality of independently seated valves to guard against accidents which might be occasioned by the lodgment of hard substances in one of the valve seats.

I accomplish the objects of the invention by the mechanism illustrated in the accompanying drawing, in which—

Figure 1:
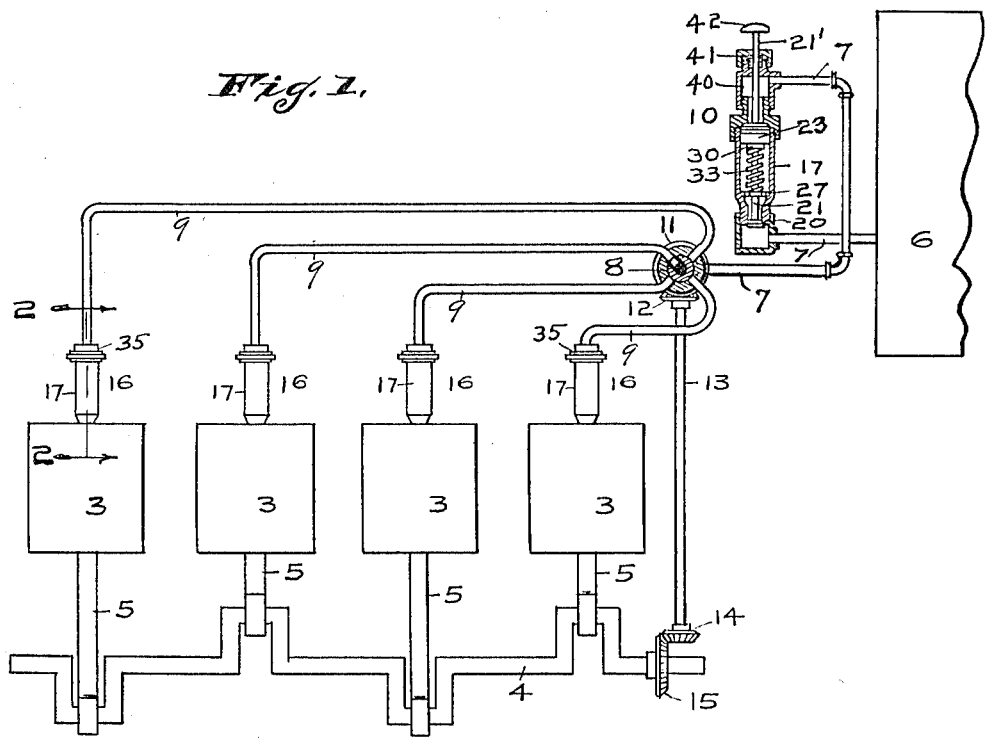
Figure 2:
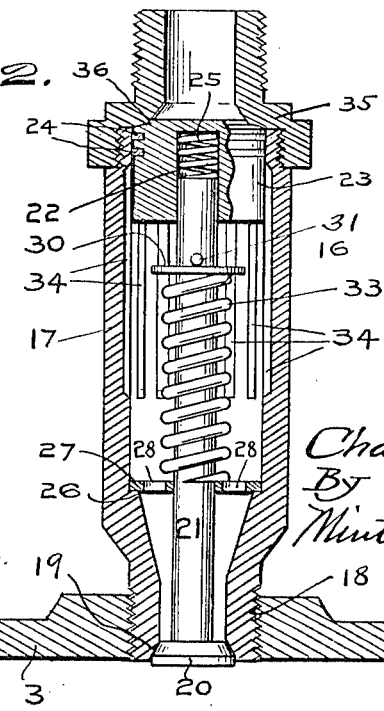

Figure 1 represents diagrammatically four cylinders connected up with a four-way rotating valve, and the latter connected with a compressed air tank with a valve of my invention between the said rotary valve and tank, the rotary valve being shown in cross-section and the other valve in longitudinal section, and the four cylinders of the engine being shown in elevation, and Fig. 2 is a longitudinal section of my improved valve on the line 2—2 of Fig. 1.

Like characters of reference indicate like parts in the two views.

3 are the engine cylinders of usual construction and of any suitable number, here shown as four.

4 is the crank shaft having cranks which are connected by rods 5 with pistons (not shown).

6 is a tank which contains a supply of air under such pressure as may be required, and compressed by any suitable means.

7 is a pipe which conveys air from the tank 6 and discharges through a four-way valve 8 successively into one of four pipes 9. The pipes 9 discharge into a respective one of each of the four cylinders 3, as shown in Fig. 1.

Between the valve 8 and tank 6 is a valve 10 which when closed cuts off all flow of air from the tank but permits the air to flow freely from the tank when the valve is open. Mounted on the stem of valve 8 is a bevel wheel 11 which meshes with a pinion 12 on shaft 13. A pinion 14 on shaft 13 meshes with wheel 15 on crank shaft 4 and by this means the valve 8 is continuously rotated so that air will be successively supplied through one of the pipes 9 to a corresponding one of the cylinders 3. The parts leading from the valve 8 are so arranged that one of the pipes 9 and its cylinder will be in open communication, whereby when air is admitted to valve 8 it will pass on to the cylinder in communication and its piston will be driven. The crank-shaft, the valve 8, and all of the connected pistons will be correspondingly moved, air will be admitted to the other cylinders in succession and the engines will thus be started from a condition of rest by the aid of the compressed air.

Valves 16, like in construction to valve 10 except that the valve stem of the latter is continued up and outside of the case for manual opening of the valve, are used at the entrance of pipes 9 to their respective cylinders, as shown, and the construction of valve 16 will now be described in detail.

The mechanism is contained within a cylindrical case 17, the lower or discharge end of which is reduced in diameter and terminates with external screw threads 18 and an internal valve seat 19, to receive a valve 20. A stem 21 from valve 20 extends up centrally of case 17 and enters a socket 22 in the under side of a piston 23 which makes an air tight fit, by the aid of packing rings 24, against the inside walls of case 17. A spring 25, seated in socket 22 against the end of valve stem 21, allows the piston 23 to move a limited distance or until spring 25 is compressed, independently of the stem 21. Near the lower end of case 17 is an annular inside shoulder 26 which forms a seat for an annular plate 27 through which the stem 21 passes, and around the opening for said stem is an annular row of holes 28 for the passage of air. The combined area of holes 28 should at least equal the area of the opening for air port valve 20 when the latter is open.

30 is a metal washer surrounding stem 21 and limited in its outward movement on the stem by the pin 31. Between the washer 30 and plate 27 is a spring 33 the function of which is to normally close the valve 20. This spring is considerably stronger than spring 25 which allows the piston to move down compressing spring 25 before the spring 33 is compressed and valve 20 opened.

The upper end of case 17 is screw threaded to receive the cap 35 which has a reduced upper end externally threaded for attachment to an end of pipe 9. A valve seat 36 is made in the shoulder on the inside of cap 35, formed by said reduced diameter of the cap.

The area of the upper end of cylinder 23 affords sufficient surface for air pressure to compress spring 33 and open valve 20 but it first compresses the weaker spring 25 lowering the piston 23 until its packing rings 24 have passed the upper ends of ports 34. The ports 34 are channels formed longitudinally of the case 17 in its inner wall. When the valve 10 is opened an inrush of air under pressure from tank 6 first compresses piston 23 opening valve 20 and ports 34 and the air then passes through to the cylinder 3. When the valve 10 is closed the tension of springs 25 and 33 closes the valve 20 against its seat and the piston 23 against its seat and back pressure is further obstructed by the packing rings in piston 23.

The valve 10 differs from valve 16 by the extension of stem $21^1$ through an upper chamber 40 from which pipe 7 from tank 6 discharges, and in the packing gland 41, to prevent leakage of air around the stem. The latter terminates outside with a cap 42 upon which the operator presses his foot to open the valve. The stem 21 is attached to piston 23 and is not a continuation of stem $21^1$.

Having thus fully described my invention what I claim as new and wish to secure by Letters Patent, is—

1. In a valve to prevent back pressure through pipes supplying air under pressure to the cylinders of explosive engines, a cylindrical valve case having a reduced discharge end in which a valve seat is formed, an outwardly opening valve in said seat, a spring to normally seat said valve, a valve stem extending inwardly of the case, a cap on said case, a piston mounted in the case and seated against the cap and a second spring weaker than said first spring to press the piston against its seat in the cap.

2. In a valve to prevent back pressure through pipes supplying air under pressure to the cylinders of explosive engines, a cylindrical valve case having a reduced discharge end in which a valve seat is formed, an outwardly opening valve in said seat, a spring to normally seat said valve, a valve stem extending inwardly of the case, a cap on said case, a piston mounted in the case and seated against the cap, a second spring weaker than said first spring to press the piston against its seat in the cap, and packing rings on the piston, the inner walls of the cylindrical valve case having longitudinal channels which begin below the packing rings when the piston is in its seat.

3. In a valve to prevent back pressure through pipes supplying air under pressure to the cylinders of explosive engines, a cylindrical valve case having a reduced discharge in which a valve seat is formed, an outwardly opening valve in said seat, a spring to normally seat said valve, a valve stem extending inwardly of the case, a cap on said case, a piston mounted in the case and seated against the cap, said cap having a socket to secure the end of said valve stem and a second spring weaker than the first in said socket pressing against the end of the stem.

4. In a valve to prevent back pressure through pipes supplying air under pressure to the cylinders of explosive engines, a cylindrical valve case having a reduced discharge in which a valve seat is formed, an outwardly opening valve in said seat, a spring to normally seat said valve, a valve stem extending inwardly of the case, a cap on said case, a piston mounted in the case and seated against the cap, said cap having a socket to secure the end of said valve stem, a second spring weaker than the first in said socket pressing against the end of the stem, and packing rings on the piston, the inner walls of the cylindrical valve case having longitudinal channels which begin below the packing rings when the piston is in its seat.

In witness whereof, I have hereunto set my hand and seal at Indianapolis, Indiana, this 13th day of May, A. D. one thousand nine hundred and eleven.

CHARLES C. ROTH. [L. S.]

Witnesses:
F. W. WOERNER,
J. A. MINTURN.

---

Copies of this patent may be obtained for five cents each, by addressing the "Commissioner of Patents, Washington, D. C."